United States Patent [19]

Yamaguchi et al.

[11] 4,078,111
[45] Mar. 7, 1978

[54] PROCESS OF EXTRUSION-COATING THE CENTRAL CORE WITH AN INSULATOR OF HIGH PRESSURE-PROCESSED POLYETHYLENE

[75] Inventors: Koji Yamaguchi, Tokyo; Hideaki Takashima, Chiba; Iwao Tsurutani, Ichihara; Toshio Nagasawa, Kyoto, all of Japan

[73] Assignee: UBE Industries, Ltd., Japan

[21] Appl. No.: 688,264

[22] Filed: May 20, 1976

[30] Foreign Application Priority Data

Jan. 6, 1976  Japan .................................. 51-100

[51] Int. Cl.$^2$ ...................... H01B 3/30; H01B 13/14
[52] U.S. Cl. ............................. 427/120; 427/374 D;
264/174; 264/118 R; 264/237; 174/110 PM;
174/120 SR
[58] Field of Search ............... 174/110 PM, 120 SR;
427/120, 117, 118, 374 D, 398 B; 264/237, 348,
174, 176 R, 178 R

[56] References Cited

U.S. PATENT DOCUMENTS

| 3,043,716 | 7/1962 | Busse et al. ........................ 427/120 |
| 3,375,303 | 3/1968 | Joyce ............................. 174/110 PM |
| 3,728,424 | 4/1973 | Bauer .............................. 264/237 X |
| 3,849,192 | 11/1974 | Schmidt .......................... 264/237 X |
| 3,852,518 | 12/1974 | Wargotz et al. ............... 174/120 SR |
| 3,868,436 | 2/1975 | Ootsuji et al. .................. 264/174 X |

Primary Examiner—Ralph S. Kendall
Attorney, Agent, or Firm—Paul & Paul

[57] ABSTRACT

Provided hereinbelow is a process of extrusion-coating the central core, said core being used in a submarine coaxial cable, with an insulator of high pressure-processed polyethylene having a density of from 0.925 to 0.940 g/cm$^3$ and a melt index of from 0.01 to 0.3 g/10 min with advantages in that said coaxial cable is allowed to be placed on a sea bottom of not less than 500 meters in depth and to effectively transmit alternating current signals with a maximum frequency of not less than 30 MHZ, while attenuation of said signals is reduced, and thus, said coaxial cable has a transmission capacity of not less than 3000 circuits or channels with a frequency band of from 3 to 6 KHz per each circuit or channels, wherein the insulator-covered-core is continuously extruded from an extruder and then is gradually cooled in cooling water troughs to room temperature so that the water content of said insulator, without formation of voids between said central core and said insulator, is reduced by as much as possible.

6 Claims, 3 Drawing Figures

PROCESS OF EXTRUSION-COATING THE CENTRAL CORE WITH AN INSULATOR OF HIGH PRESSURE-PROCESSED POLYETHYLENE

The present invention relates to a process of preparing a submarine coaxial cable having a large transmission capacity for use in the deep sea, comprising an inner conductor, an outer conductor and an insulator therebetween made of high pressure-processed polyethylene having a density of from 0.925 to 0.940 g/cm$^3$ and a melt index of from 0.01 to 0.3 g/10 min.

In general, a submarine coaxial cable for use in the deep sea comprises: a central core which consists of an inner conductor and tensioning wires; an insulator coated around the inner conductor; an outer conductor which is on said insulator and is arranged coaxially with said inner conductor; and a cable jacket coated on said outer conductor. The inner conductor of copper is coated around the tensioning wires of steel which are combined into an entire unit to form a central core of a circular section. The insulator on the central core is formed by an extrusion of molten high pressure-processed polyethylene. The outer conductor is formed by wrapping a thin copper plate around the insulator-covered-core.

The cable jacket around the outer conductor is usually formed by an extrusion of molten polyethylene or of other resins.

In particular, the present invention is directed to a process of covering the central core with an extrudate of polyethylene as specified before, that is, a process of extrusion-coating the central core with an insulator of the specified polyethylene.

The conventional submarine coaxial cable for use in the deep sea has an insulator of high pressure-processed polyethylene having a density of not more than about 0.920 g/cm$^3$ and a melt index (MI) of not more than 0.2 g/10 min, and said coaxial cable can transmit alternating current signals with a maximum frequency of about 6 MHz, and thus, said coaxial cable has a transmission capacity of about 850 circuits or channels with a frequency range or band of from 3 to 6 KHz per each circuit. In practice, such kinds of cables have been placed on the deep sea bottoms of most of the oceans in the world.

Since development of international communications utilizing the above submarine coaxial cables have been expected due to increasing transmission loads and increasing demands made upon world-wide communications, the placing of submarine coaxial cables having a large transmission capacity on sea beds has been planned under these circumstances. In trial, such cables capable of transmitting alternating current signals with a maximum frequency of about 30 MHz or more and thus having a transmission capacity of about 3000 circuits (or channels) or more with a frequency band of from 3 to 6 KHz per each circuit (or channel) have already been placed on sea bottoms.

To this end, utilization of the conventionally used high pressure-processed polyethylene, which has a density of not more than about 0.920 g/cm$^3$ and a melt index of not more than 0.2 g/10 min, in a cable as a material for the intermediate insulator would lead to considerable attenuation of applied alternating signals of a high frequency and would thus require an increase in the number of repeaters or amplifiers employed for reducing such an attenuation. As a result, the placing of a cable system such as the above would not be economical.

In this respect, it has been suggested that high pressure-processed polyethylene with a density of from 0.925 to 0.940 g/cm$^3$ and a melt index of from 0.01 to 0.3 g/10 min be applied to the submarine coaxial cable as a material for the insulator, in order to reduce the attenuation of alternating current signals with a maximum frequency of not less than 30 MHz.

During communication through such submarine coaxial cables, alternating current signals with a frequency band of from 3 to 6 KHz per each circuit are applied. The applied signals of these signals are gradually attenuated while said signals are transmitted through the long cables. Particularly, in a case of a signal with a high frequency of not less than 30 MHz, said signal is transmitted with a considerably great attenuation of its alternating signal. Therefore, it is required to reduce the attenuation of such high frequency signals as much as possible.

When the alternating current signal is transmitted through the inner and outer conductors in the coaxial cable, the attenuation factor $\alpha$ of its signal per one nautical mile (dB/nm) is a function of the frequency $f$ (MHz) of the alternating current signal, of the dielectric constant $\epsilon$ and of the dielectric loss tangent (E$p$) or tan $\delta$ of the insulator in the cable, as shown in the following formula:

$$\alpha = a \cdot \sqrt{f} \cdot \sqrt{\epsilon} + b \cdot f \cdot Ep \cdot \sqrt{\epsilon},$$

where $a$ and $b$ are constants.

According to the above formula, to reduce the attenuation factor $\alpha$, it is necessary to use, for the insulator in the cable, an insulating material having the dielectric constant $\epsilon$ and the dielectric loss tangent (E$p$) of which values are as low as possible. In this respect, the high pressure-processed polyethylene having a density of 0.925 to 0.940 g/cm$^3$ and a melt index of from 0.01 to 0.3 g/10 min seems to be suitable for effectively reducing the attenuation factor $\alpha$.

This is because the above-mentioned polyethylene originally has a dielectric loss tangent (E$p$) which is considerably less than that of the conventionally used polyethylene produced by the high pressure process and having a density of not more than about 0.920 g/cm$^3$ and a melt index of not more than 0.2 g/10 min, as is apparent from the following Table 1.

All of the data regarding the density of the polyethylene mentioned in the specification were obtained by measuring according to JIS K6760, except that the measurements were carried out with the polyethylene having a temperature of not 20° but 23° C. With respect to the melt index of the polyethylene mentioned in the specification, it was measured according to ASTM D1238.

Table 1

| Physical properties of high pressure processed polyethylene | | Electrical properties of high pressure-processed polyethylene | |
|---|---|---|---|
| Density (g/cm) | MI (g/10min) | Dielectric constant | Dielectric loss tangent (Ep) at 30 MHz ($\times 10^{-6}$) |
| 0.920 | 0.13 | 2.285 | 95 |
| 0.925 | 0.19 | 2.295 | 56 |
| 0.930 | 0.19 | 2.300 | 47 |
| 0.935 | 0.19 | 2.304 | 38 |

However, it should be noted that when the central core of the cable is coated with an insulating layer of the high pressure-processed polyethylene having a density of from 0.925 to 0.940 g/cm³ and a melt index of from 0.01 to 0.3 g/10 min by the extrusion-coating process which has been utilized for preparing the conventional submarine coaxial cable for transmitting alternating current signals with a maximum frequency of 6 MHz, the insulating layer of the extrudate does not exhibit a dielectric loss tangent of a value equivalent to the original dielectric loss tangent value indicated in Table 1. In this respect, the conventional extrusion-coating process is not suitable for the preparation of a submarine coaxial cable for effectively transmitting an alternating current signal with a maximum frequency of not less than about 30 MHz.

An object of the present invention is to provide a process of coating the central core for use in a submarine coaxial cable to be placed on deep sea beds, with an extrudate of molten high pressure-processed polyethylene having a density of from 0.925 to 0.940 g/cm³ and a melt index of from 0.01 to 0.3 g/10 min, so that the coated polyethylene forming an insulator in use will exhibit a dielectric loss tangent of a value close to the original value of the above polyethylene with advantages in that the cable is allowed to be placed on the sea bottom of not less than about 500 meters and can transmit alternating current signals with a maximum frequency of not less than about 30 MHz, while alternation of the signals is effectively reduced, and thus, said cable has a transmission capacity of not less than about 3000 circuits with a frequency band of from 3 to 6 KHz per each circuit.

According to the present invention, the insulator covering the central core exhibits a dielectric loss tangent of a value from 35 to $60 \times 10^{-6}$ which value is suitable to a cable for use in transmitting alternating current signals with a maximum frequency of not less than about 30 MHz and which value is close to the original dielectric loss tangent value of the polyethylene.

Furthermore, according to the present invention, the coated insulator around the central core does not have any voids formed at the boundary between the insulator and the central core, such as air bubbles. Said coated insulator is also excellent in mechanical strength, since its gripping strength against the central core is relatively great. These facts are obtained from the results of specific extrusion-coating conditions of the polyethylene and are features of the present invention.

The present invention will now be explained in detail by way of referring to examples accompanied by appropriate drawings in which.

Figure 1:
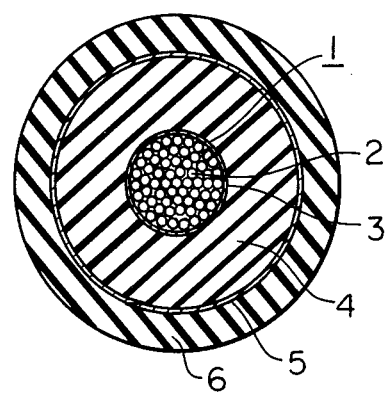
FIG. 1 is a diagrammatic sectional view of the submarine coaxial cable according to the present invention.

Referring to FIG. 1, a central core 1 consists of steel wires 2 and an inner conductor 3 of a copper layer covering the combined tensioning wires 2. The central core 1 is covered with an insulator 4 of high pressure-processed polyethylene to form an insulator-covered-core. The insulator 4 is wrapped with an outer conductor 5 of a copper thin plate. The wrapped outer conductor 5 is covered with a cable jacket 6 of medium or low pressure-processed polyethylene to finally form a submarine coaxial cable for use in the deep sea.

In the above arrangement of the cable, both the insulator 4 composed of high pressure-processed polyethylene between the inner conductor 3 and the outer conductor 5 and the cable jacket 6 composed of medium or low pressure-processed polyethylene are respectively formed by utilizing the extrusion-coating processes. However the present invention is directed only to a coating process of the insulator 4.

Figure 2:
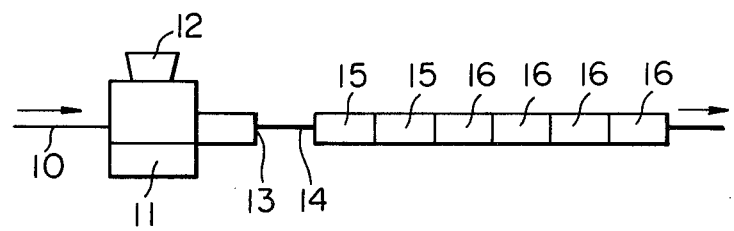
FIG. 2 is a diagrammatic side view showing the extrusion-coating process of the present invention.

Referring to FIG. 2, a central core 10, which corresponds to that indicated by numeral 1 in FIG. 1, is continuously supplied into an extruder 11, while a polyethylene material is fed into the extruder through a hopper 12. In the extruder 11, the central core 10 is coated with a molten or plasticized material of polyethylene. The central core covered with the molten polyethylene, that is, the insulator-covered-core 14, is extruded through an extrusion outlet forming a die 13, and then successively moved through a first group of cooling water troughs 15 and subsequently moved through a second group of cooling water troughs 16 in succession so that the insulator-covered-core 14 is gradually cooled.

According to the present invention, the insulator 4 between the coaxially arranged inner and outer conductors is made of high pressure-processed polyethylene having a density of from 0.925 to 0.940 g/cm³, preferably from 0.926 to 0.935 g/cm³ and a melt index of from 0.01 to 0.3 g/10 min, preferably from 0.1 to 0.25 g/10 min. Such a kind of high pressure-processed polyethylene as the above originally exhibits a dielectric loss tangent of a value from 30 to $58 \times 10^{-6}$ according to measurements by a method described hereinbelow. A preferable polyethylene of this kind has a melting point (Tmp) of from 110° to 130° C according to measurements by the DSC method. Such preferable polyethylenes are; for example, high pressure-processed polyethylene produced by the Rexall process, UBEC2020 (UBE Industries Ltd. in Japan); high pressure-processed polyethylene produced by the UCC process, BXL-0171 Bakelite Xylonite Ltd. in England); and high pressure-processed polyethylene produced by the ICI process (ICI Ltd. in England).

In general, high pressure-processed polyethylene exhibits an increase in the value of its dielectric loss tangent according to a decrease of its density. In particular, the dielectric loss tangent becomes increasingly larger at a density less than 0.925 g/cm³. Therefore, the high pressure-processed polyethylene having a density of less than 0.925 g/cm³ is not suitable for use as a material of the insulator (that is, the insulator between the coaxially arranged inner and outer conductors), since the dielectric loss tangent is of an excessively large value.

The high pressure-processed polyethylene having a density of more than 0.940 g/cm³ has not yet been produced on an industrial scale.

Furthermore, high pressure-processed polyethylene having a melt index of more than 0.3 g/10 min is not suitable, since the insulator of said polyethylene formed on the central core by the extrusion-coating process would have its mechanical strength reduced, and particularly with its environmental stress crack resistance reduced.

According to the present invention, the insulator-covered-core is continuously extruded from the extruder 11 in FIG. 2, ensuring its temperature $T_0$ at the extrusion outlet from 170° to 200° C, but preferably from 175° to 195° C. The other extruding conditions in the process of the invention are not limited to specific ones, and said conditions may be optionally chosen according to the size of the insulator-covered-core, the properties of the high pressure-processed polyethylene utilized and so on.

An extruding condition wherein the covering extrudate has a temperature $T_0$ of less than 170° C at the extrusion outlet is not suitable, since the viscosity of the molten high pressure-processed polyethylene becomes too high to coat the central core with a molten resin of a uniform thickness over the entire length and since the coating extrudate from the extrusion outlet becomes easily cracked when the coated core is subjected to substantial tension.

A temperature $T_0$ of the extrudate at the extrusion outlet over 200° C is not suitable, since the insulator of the extrudate covering the central core will exhibit a dielectric loss tangent of a value considerably larger than the original dielectric loss tangent value of the polyethylene used.

According to the present invention, as shown in FIG. 2, the insulator-covered-core 14 having an extrudate of the polyethylene at a temperature $T_0$ of from 170° to 200° C at the extrusion outlet is gradually cooled for about 10 to 30 minutes in the first group of the cooling water troughs 15, each containing water at a temperature $T_1$ which is in the range of from 80° to 100° C, but more preferably at a temperature of from 85° to 98° C and which is lower than the melting point (Tmp) of the polyethylene used by a difference of from 10° to 30° C. Furthermore the insulator-covered-core is gradually cooled to room temperature in the second group of cooling water troughs 16. In other words, it is necessary to ensure that the temperature $T_1$ of the water in the troughs belonging to the first group satisfies the following two temperature conditions: 80° C $\leq T_1 \leq$ 100° C and (Tmp-30) $\leq T_1 \leq$ (Tmp $-10$)° C, and to ensure that the time utilized for cooling in the first group of troughs remain entirely in a range of from about 10 to 30 minutes. Besides ensuring that all the above conditions are completely satisfied, other specific requirements designating the number of the first group of troughs used and designating the size and the water temperature of each trough are not required. However, the first group should preferably include from one to five troughs and particularly from one to three troughs. It is also preferable to arrange the first group of troughs so that each trough except for the first one contains cooling water of a temperature lower than that of its neighbouring upstream trough by a difference of from 3° to 10° C.

In the above gradually cooling process, if the water temperature $T_1$ of the first group of troughs fulfills the following conditions: 80° C $> T_1$ or (Tmp -30)° C $> T_1$, the insulator-covered-core is then forced to be quenched to such an extent that voids would be produced at the boundary located between the insulator and the inner conductor and/or the gripping strength of the insulator against the central core would be reduced. In this respect, such a temperature condition is not desirable.

Furthermore, if the water temperature $T_1$ is in the temperature condition of $T_1 > 100°$ C or $T_1 > $(Tmp -10)° C, the insulator, after being cooled to room temperature, will exhibit a dielectric loss tangent of a value considerably larger than the original dielectric loss tangent value of the high pressure-processed polyethylene used. In this respect, such a temperature condition is also not suitable.

According to the present invention, the second group of cooling water troughs, downstream of the first group of troughs, which includes at least two cooling water troughs, is enough for gradually cooling the insulator-covered-core to room temperature. As long as the above conditions are maintained, other requirements pertaining to the number of troughs used and to the size and the water temperature of each trough are not required. However, the second group should preferably include from three to ten troughs and particularly from four to seven troughs. The first trough in the second group, that is the trough nearest to the first group, contains water at a temperature $T_2$ preferably lower than that of the last trough in the first group by a difference of from 3° to 30° C, and particularly by a temperature difference of from 5° to 25° C. It is preferable to arrange the second group of troughs in such a way that each trough, except for the first one, contains cooling water at a temperature lower than that of the neighbouring upstream trough by a difference of from 3° to 30° C and particularly by a temperature difference of from 5° to 25° C. Furthermore, the time required for cooling in the second group of troughs does not have to be limited to a specific range. However, the entire duration of the cooling time should remain preferably within a range of from 50 to 170 minutes, or particularly from 60 to 140 minutes.

The insulator-covered-core prepared according to the present invention can be suitable for use in a submarine coaxial cable to be placed on a sea bottom of not less than 500 meters in depth for effectively transmitting alternating current signals with a maximum frequency of not less than about 30 MHz, since said insulator-covered-core does not have voids formed at the boundary between the insulator and the inner conductor. Moreover, said insulator-covered-core is further suitable for the above use since the gripping strength of its covering insulator against the central core is as much as or more than that of the conventional submarine coaxial cable used for transmitting alternating current signals with a maximum frequency of 6 MHz and also since its insulator has a dielectric loss tangent of a relatively lower value in the range from 35 to 60$\times 10^{-6}$.

Figure 3:
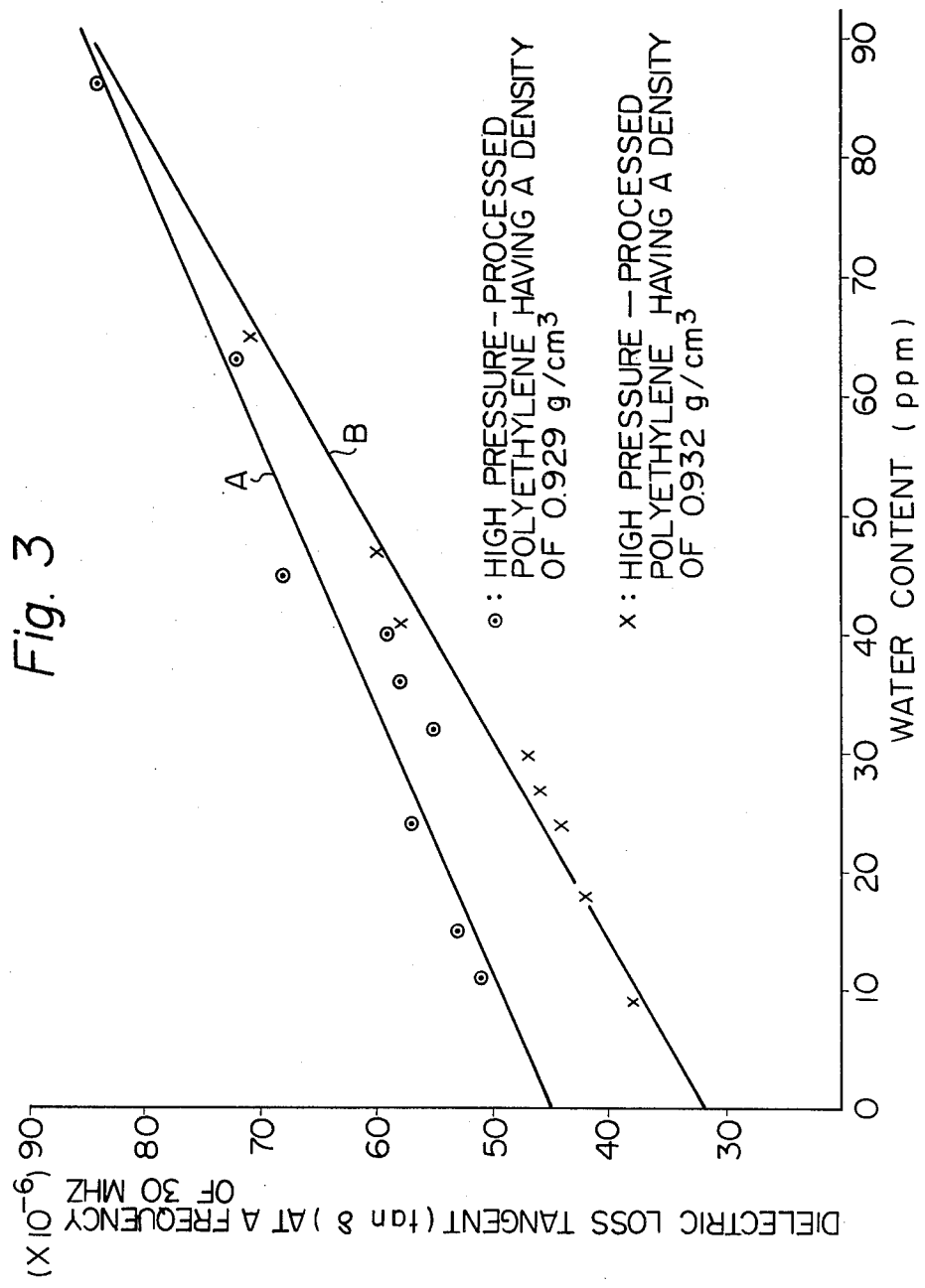
FIG. 3 is a graph showing proportional relationships of the dielectric loss tangent of the high pressure-processed polyethylene to the water content of the polyethylene in ppm.

Measurements of the water content in the insulator produced according to the present invention indicate that the value of the dielectric loss tangent of the produced insulator is clearly related to the water content as shown in FIG. 3. In this view, the present invention, in one aspect, is considered to provide a method of ensuring that the insulator covering the central core has a dielectric loss tangent of a value almost equivalent to that of the original value of the high pressure-processed polyethylene by reducing the water content of the insulator while the insulator-covered-core is being produced.

Examples of the present invention and controls to be compared with said examples are discussed below.

To begin with, in the examples and controls, values of the dielectric constant and of the dielectric loss tangent were measured according to the measurement standard M137 established by Head Quarters of the Post Office Telecommunications in London. In the measurement, electrodes according to ASTM-D1531 were used to measure dielectric characteristics of alternating current signals having frequencies of 30 MHz.

A moisture analyzer 26-321A made by E. I. DU PONT DE NEMOURS & CO. was used to measure the water content of the insulators.

With respect to the voids included in the prepared insulator-covered-core, incisions were made at several sections of each insulator to survey or observe formations of voids. As a result, in the following Tables 2 and 3, an indication "NO" means that no void was recognized, while the other indication "YES" means that at least one void was recognized.

With respect to the measurements of the gripping strength of the insulator, samples were prepared from the insulator-covered-core by cutting them into pieces and then peeling off a portion of the covering insulator of each piece so that the removed portion was from 2 to 5 cm long and the remaining portion was also from 2 to 5 cm long. Several samples from each insulator were subjected to an Instron tension tester whereby pieces were pulled off the central core and measurements were taken of their tensile strengths.

EXAMPLES 1 THROUGH 5

High pressure-processed polyethylene having a density of 0.929 g/cm$^3$, a melt index of 0.2 g/10 min, a melting point of 115° (according to the DSC method) and a dielectric loss tangent of $48 \times 10^{-6}$ at a frequency of 30 MHz [UBE Industries Ltd., a trade name; UBE polyethylene, UBEC2020] was adopted as a material for use as the insulator covering the central core of each example. This material was fed into an extruder, designed for a submarine coaxial cable having a screw diameter of 150 mm [Davis Standard Co.], through the hopper thereof, while a central core having an outer diameter of 12.2 mm was supplied into the extruder. The extruder was operated so that the temperature $T_0$ of the resin material at the extrusion outlet could be controlled according to the values shown in Table 2. In the next step, an insulator-covered-core having an outer diameter of 46.2 mm was extruded. The extruded insulator-covered-core was gradually cooled to room temperature by moving it continuously through a first group of at least one cooling trough and then through a second group of cooling troughs. The cooling time of the extruded core in each trough and the temperature of the water in each trough were controlled by values indicated in Table 2.

The obtained insulator-covered-core was left alone for one hour and then was cut into pieces as previously stated. These pieces were subjected to measurements or surveys of the water-content (ppm), of the dielectric loss tangent at a frequency of 30 MHz, of formations of voids, and of the gripping strength of the insulator by utilizing the aforementioned methods. The results of these measurements are shown in Table 2.

CONTROLS 1 THROUGH 5

In Controls 1 through 5, the same extrusion-coating processes carried out in Examples 1 through 5 were employed. The kinds of polyethylene, tensioning wires, extruder, and cooling troughs utilized in the extrusion-coating processes of Controls 1 through 5 were the same as those found in the above Examples 1 through 5. The only differences between the examples and the controls resided in the temperature $T_0$ of the resin material at the extrusion outlet, the temperature of the water in each trough, and the cooling time of each trough in the first group. Such differences in the controls were determined by the values indicated in Table 2. The results of the measurements in Controls 1 through 5 acquired by the same methods as those of Examples 1 through 5 regarding the obtained insulator-covered-cores are shown in Table 2.

EXAMPLES 6 THROUGH 9

In these examples, high pressure-processed polyethylene having a density of 0.932 g/cm$^3$, a melt index of 0.2 g/10 min, a melting point of 118° C (according to the DSC method) and a dielectric loss tangent of $35 \times 10^{-6}$ was adopted as a resin material for use as the insulator. Extrusion-coating processes were carried out in the same manner as the those of Examples 1 through 5 except for differences in the temperature $T_0$ of the polyethylene at the extrusion outlet, the temperature of the water in each trough, and the cooling time in each trough which were set to values as indicated in Table 3. The results of the measurements, obtained in the same manner as those of previous examples, regarding the produced insulator-covered-cores are shown in Table 3.

CONTROLS 6 THROUGH 10

The same kind of polyethylene as that of Examples 6 through 9 was used as a resin material for the insulator. Extrusion-coating processes were carried out in the same manner as those of Controls 1 through 5, and the temperature $T_0$ of each trough and the cooling time in each of the first group of troughs were set to values as indicated in Table 3. The results of the measurements obtained in the same manner as those of Controls 1 through 5, regarding the produced insulator-covered-cores are shown in Table 3.

The graph shown in FIG. 3 was prepared by plotting the data of the Examples and Controls regarding the dielectric loss tangent and the water content. In the graph, line A shows a trend in the variation of the dielectric loss tangent of the polyethylene having a density of 0.929 g/cm$^3$ and a melt index of 0.2 g/10 min (in Examples 1 through 5 and Controls 1 through 5) with respect to the water content expressed in ppm of the polyethylene, while line B shows a trend of the dielectric loss tangent of the polyethylene having a density of 0.932 g/cm$^3$ and a melt index of 0.2 g/10 min (in Examples 6 through 9 and Controls 6 through 10) with respect to the water content.

As is apparent from the two lines A and B, the dielectric loss tangent of the high pressure-processed polyethylene relates closely to the water content of the polyethylene in such a manner that the value of the dielectric loss tangent decreases linearly according to a decrease in the water content. Therefore, according to the present invention, a process of coating the central core with an insulator of high pressure-processed polyethylene having a density of a considerably large value is carried out so that the water content of the insulator coated around the central core is reduced without formation of voids between the central core and the insulator.

Table 2

| | The first group of cooling water troughs | | | | The second group of cooling water troughs | | | | | The measurement results of the insulator-covered-cores | | | |
|---|---|---|---|---|---|---|---|---|---|---|---|---|---|
| | Extrusion outlet temp. (° C) | 1st trough water temp. (° C) | 2nd trough water temp. (° C) | Total cooling time (min) | 1st trough water temp. (° C) | 2nd trough water temp. (° C) | 3rd trough water temp. (° C) | 4th trough water temp. (° C) | 5th trough water temp. (° C) | Water content (ppm) | Dielectric loss tangent at 30 MHz (×10⁻⁶) | Formation of voids | Gripping strength (kg/cm) |
| Example | | | | | | | | | | | | | |
| 1 | 175 | 95 | 90 | 26 | 70 | 50 | 40 | 20 | — | 32 | 55 | No | over 40 |
| 2 | 185 | 95 | 90 | 26 | 70 | 50 | 40 | 20 | — | 36 | 58 | No | over 40 |
| 3 | 195 | 95 | 90 | 26 | 70 | 50 | 40 | 20 | — | 40 | 59 | No | over 40 |
| 4 | 185 | 85 | — | 15 | 80 | 70 | 50 | 40 | 20 | 15 | 53 | No | over 40 |
| 5 | 185 | 90 | — | 15 | 80 | 70 | 50 | 40 | 20 | 24 | 57 | No | over 40 |
| Control | | | | | | | | | | | | | |
| 1 | 215 | 95 | 90 | 26 | 70 | 50 | 40 | 20 | — | 45 | 68 | No | over 40 |
| 2 | 160 | 95 | 90 | 26 | 70 | 50 | 40 | 20 | — | * | * | * | * |
| 3 | 185 | 105 | 95 | 26 | 70 | 50 | 40 | 20 | — | 85 | 84 | No | over 40 |
| 4 | 185 | — | — | — | 70 | 60 | 50 | 40 | 20 | 11 | 51 | Yes | less than 25 |
| 5 | 185 | 95 | 90 | 40 | 70 | 50 | 40 | 20 | — | 63 | 72 | No | over 4 |

(Note)
1. All data in the columns indicated by marks * were not measured since the insulator-covered-core of control 2 was apparently recognized as not being effective for use in a submarine coaxial cable.
2. Marks — indicate the trough being not applied.

Table 3

| | The first group of Cooling water troughs | | | | The second group of cooling water troughs | | | | | The measurement results of the insulator-covered-cores | | | |
|---|---|---|---|---|---|---|---|---|---|---|---|---|---|
| | Extrusion outlet temp. (° C) | 1st trough water temp. (° C) | 2nd trough water temp. (° C) | Total cooling time (min) | 1st trough water temp. (° C) | 2nd trough water temp. (° C) | 3rd trough water temp. (° C) | 4th trough water temp. (° C) | 5th trough water temp. (° C) | Water content (ppm) | Dielectric loss tangent at 30 MHz (×10⁻⁶) | Formation of voids | Gripping strength (kg/cm) |
| Example | | | | | | | | | | | | | |
| 6 | 175 | 95 | 90 | 26 | 70 | 50 | 40 | 20 | — | 24 | 44 | No | over 40 |
| 7 | 185 | 95 | 90 | 26 | 70 | 50 | 40 | 20 | — | 27 | 46 | No | over 40 |
| 8 | 195 | 95 | 90 | 26 | 70 | 50 | 40 | 20 | — | 30 | 47 | No | over 40 |
| 9 | 185 | 90 | — | 15 | 80 | 70 | 50 | 40 | 20 | 18 | 42 | No | over 40 |
| Control | | | | | | | | | | | | | |
| 6 | 215 | 95 | 90 | 26 | 70 | 50 | 40 | 20 | — | 41 | 58 | No | over 40 |
| 7 | 160 | 95 | 90 | 26 | 70 | 50 | 40 | 20 | — | * | * | * | * |
| 8 | 185 | 105 | 95 | 26 | 70 | 50 | 40 | 20 | — | 65 | 71 | No | over 40 |
| 9 | 185 | — | — | — | 70 | 60 | 50 | 40 | 20 | 9 | 38 | Yes | less than 25 |
| 10 | 185 | 95 | 90 | 40 | 70 | 50 | 40 | 20 | — | 47 | 60 | No | over 40 |

(Note)
1. All data in the columns indicated by marks * were not measured since the insulator-covered-core of control 7 was apparently recognized as not being effective for use in a submarine coaxial cable.
2. Marks - indicate the trough being not applied.

What is claimed is:

1. A process of extrusion-coating the central core, for use in a submarine coaxial cable for communication with alternating current signals having a maximum frequency of not less than 30 MHz, with an insulator of high pressure-produced polyethylene having a density of from 0.925 to 0.940 g/cm³ and melt index of from 0.01 to 0.3 g/10 min, comprising the steps of:
   (a) extruding the central core covered with the insulator of polyethylene from an extruder, wherein a temperature of the polyethylene at the extrusion outlet is in the range of from 170° to 200° C;
   (b) just after extrusion into the atmosphere, immersing, and moving the extruded insulator-covered-core through a first group of at least one cooling water trough containing cooling water of a temperature which is in the range of from 80° to 100° C and is lower than the melting point of the polyethylene by a difference of from 10° to 30° C, thereby cooling the extruded insulator-covered-core gradually for about 10 to 30 minutes, and;
   (c) further, moving said insulator-covered-core through a second group of at least two cooling water troughs, thereby cooling the insulator-covered-core gradually to room temperature.

2. An extrusion-coating process according to claim 1, wherein said first group of cooling water troughs are arranged so that each trough except for the first one contains cooling water of a temperature lower than that of the neighbouring upstream trough by a difference of from 3° to 10° C.

3. An extrusion-coating process according to claim 1, wherein said insulator-covered-core passes through a first group of one to five cooling water troughs.

4. An extrusion-coating process according to claim 1, wherein the first trough in said second group of cooling water troughs contains cooling water of a temperature lower than that of the last trough in the first group by a difference of from 3° to 30° C.

5. An extrusion-coating process according to claim 1, wherein said second group of cooling water troughs are arranged so that each trough except for the first one contains cooling water of a temperature lower than that of the neighbouring upstream trough by a difference of from 3° to 30° C.

6. An extrusion-coating process according to claim 1, wherein the cooling time of said insulator-covered-core in said second group of cooling water troughs is entirely within the range of from 50 to 170 minutes.

* * * * *